(12) United States Patent  
Collins

(10) Patent No.: US 6,609,574 B1  
(45) Date of Patent: Aug. 26, 2003

(54) FOLDING SUPPORT FRAME

(76) Inventor: Jeffrey Lee Collins, 24312 670$^{th}$ Ave., Nevada, IA (US) 50201

( * ) Notice: Subject to any disclaimer, the term of this patent is extended or adjusted under 35 U.S.C. 154(b) by 0 days.

(21) Appl. No.: 09/927,248

(22) Filed: Aug. 10, 2001

Related U.S. Application Data

(60) Provisional application No. 60/224,145, filed on Aug. 10, 2000.

(51) Int. Cl.$^7$ .......................... A01B 49/00; A01B 63/16
(52) U.S. Cl. ...................... 172/311; 172/406; 172/413; 172/423; 172/662
(58) Field of Search .............................. 172/311, 310, 172/395, 400, 405, 406, 407, 413, 416, 423, 452, 456, 662, 776

(56) References Cited

U.S. PATENT DOCUMENTS

| | | |
|---|---|---|
| 3,941,194 A | 3/1976 | Orthman |
| 4,058,172 A | 11/1977 | Blair et al. |
| 4,299,292 A | 11/1981 | Hughes |
| 4,496,004 A | 1/1985 | Frase et al. |
| 4,502,545 A | 3/1985 | Couser |
| 4,700,784 A | 10/1987 | Wiebe et al. |
| 4,896,732 A | 1/1990 | Stark |
| 5,113,956 A | 5/1992 | Friesen et al. |
| 5,291,954 A | 3/1994 | Kirwan |
| 5,358,056 A | 10/1994 | Gates |
| 5,488,996 A | 2/1996 | Barry et al. |
| 5,647,440 A | 7/1997 | Barry et al. |
| 5,787,988 A | 8/1998 | Harlan et al. |
| 5,839,516 A | 11/1998 | Arnold et al. |

*Primary Examiner*—Christopher J. Novosad

(57) ABSTRACT

An improved toolbar implement is described comprising a main support bar for attachment to a tractor, a pair of folding wings supported on a wheel assembly and connected to the main support bar, and a plurality of ground working tool assemblies attached to each of the folding wings and the main support bar. The folding wings pivot about an axis set-back rearwardly from the main support bar to allow clearance of the ground working tools as the wings are moved from a transversely extended working position to a rearwardly extended transport position.

16 Claims, 9 Drawing Sheets

FOLDING SUPPORT FRAME

RELATED APPLICATION

This application claims the benefit of U.S. Provisional Application No. 60/224,145, filed Aug. 10, 2000.

BACKGROUND OF THE INVENTION

1. Field of the Invention

This invention relates generally to support frames for supporting agricultural ground working equipment, and more specifically, to a farm implement support frame of extended width for working fields of row crops.

2. Background of the Prior Art

Typical cultivating equipment consist of a plurality of plows or blades that are arranged in spaced relation across a transverse toolbar carried on a tractor and towed through a field. The plows or blades engage the soil between the rows of crops digging up weeds and hilling the displaced soil onto the rows of growing plants. With the increased power available with modern tractors, it has become possible to use cultivating equipment of extended width. The obvious problem, however, is that cultivating equipment of extended width must somehow be collapsed or folded to a reduced width for transport over roads to gain access to fields, many of which are situated in remote locations.

It is known in the art to provide forward folding support frames for cultivating equipment of extended width. It is also known to provide vertically folding support frames for cultivating equipment of extended width. It is further known to provide rearward folding support frames for cultivating equipment of extended width.

Nevertheless, there remains a need for improvements in the art of folding support frames for cultivating equipment of extended width.

SUMMARY OF THE INVENTION

An improved toolbar implement is described comprising a main support bar for attachment to a tractor, a pair of folding wings supported on dolly wheels and connected to the main support bar, and a plurality of ground working tool assemblies attached to each of the folding wings and the main support bar. The device of the present invention allows for the attachment of a plurality cultivator units or other attachments on a single toolbar. The toolbar has a forward, main support bar that is adapted for attachment to the three-point hitch of a tractor. Folding wings are attached to the main support bar at either end thereof for pivotal movement in a horizontal plane about a corresponding substantially vertical axis. A wing is pivotally attached at each end of the main support bar on a pair of framing elements extending from the main bar. Each wing is movable independent of each other. The vertical pivoting axis is set back from the main support bar to gain clearance from the working tool assemblies, which trail and are attached to the main support bar, such that when the folding wings are pivotally moved, the trailing end of the working tool assemblies mounted on the main bar do not interfere with the working tool assemblies mounted on the folding wings. The pivotal attachment allows the wings to be moved from a transversally extended working position to a substantially rearwardly extended transport position. The extended end of each of the wings is supported on a dolly wheel by a four bar linkage. When configured to its transport position, a transport wheel assembly is provided on each wing.

Each of the wings is further supported for pivotal movement about a substantially horizontal axis to allow the height of the wings to be adjusted by extension and retraction of a hydraulic cylinder associated with the dolly wheels. The movement of the hydraulic cylinders associated with the dolly wheels is coordinated with the movement of the three-point hitch to provide for proper depth setting of the cultivator units across the length of the wings and main support bar.

An improved folding agricultural implement of extended width is provided that is capable of transformation from an extended, earth working position, to a retracted, transport position for travel over typical roadways.

These and other aspects of the present invention will become apparent to those skilled in the art upon reference to the following specification and drawings.

DETAILED DESCRIPTION OF THE INVENTION

Figure 1:
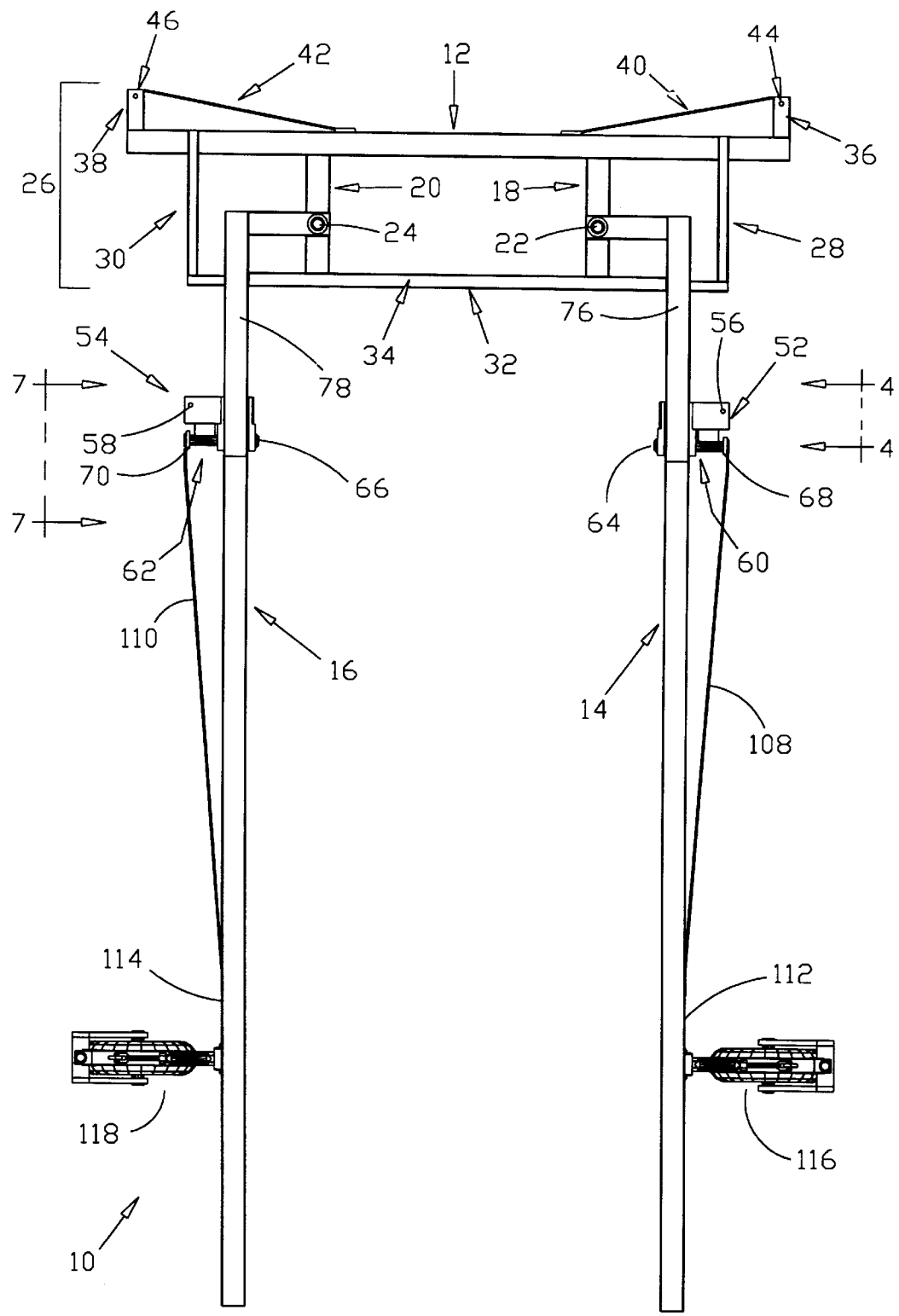
FIG. 1 is a top plan view of the implement showing the implement in its transport position with rearward folded wings in accordance with the teachings of the present invention, shown without earth working tools.
Figure 2:
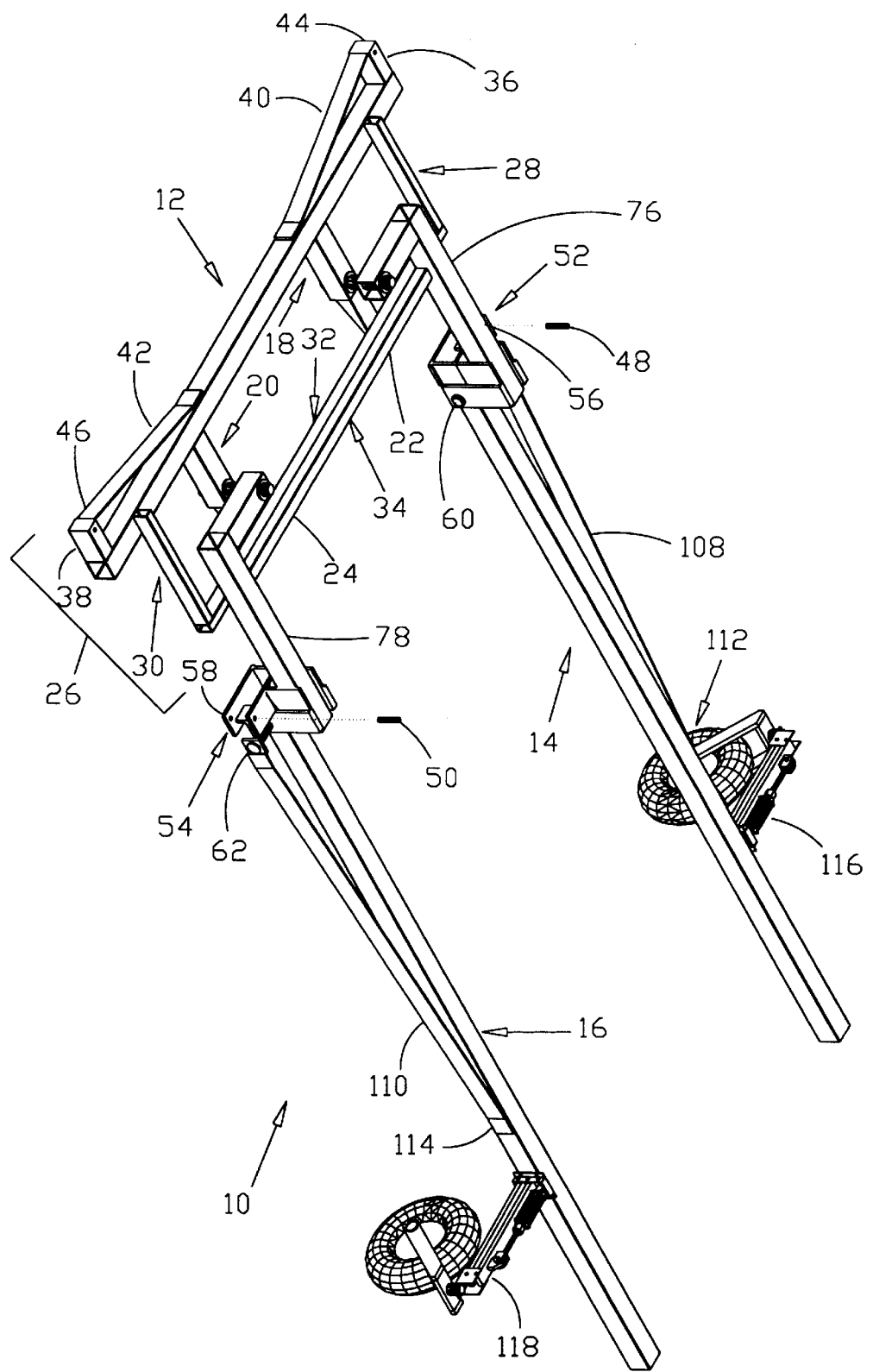
FIG. 2 is a perspective view of the implement showing the implement corresponding to FIG. 1.

Referring to FIGS. 1 and 2, there is shown a folding support frame assembly indicated generally at 10. The folding support frame is towed by a tractor (not shown) and is used to support soil cultivating tools, such as plows or blades, used to engage the soil between the rows of crops to dig up weeds and hill the displaced soil onto the rows of growing plants. The folding support frame 10 includes a main support bar 12, a first wing 14, and a second wing 16. In general, reference to the first wing and its related components is a reference to the right wing of the implement, when the implement is oriented in its forward moving, working position and viewed from behind. Likewise, reference to the second wing and its related components is a reference to the left wing of the implement, when the implement is oriented in its forward moving, working position and viewed from behind. The main support bar 12 and the wings 14, 16 in a fully extended, earth working, operational mode is referred to collectively as the tool bar.

In the preferred embodiment, the main support bar 12, the first wing 14, and the second wing 16 each are provided with soil cultivating tools, such as plows or blades (not shown). To support the first wing 14 and the second wing 16 on the main support bar 12, a first pivot support bar 18 and a second pivot support bar 20 are provided. The pivot support bars 18, 20 each include an aperture that receives a first pivoting shaft assembly 22 in the first pivot support bar 18, and a second pivoting shaft assembly 24 in the second pivot support bar 20. The pivoting shaft assemblies 22, 24 are in pivotal communication with the first and second wings 14, 16. The vertical pivoting axes established by pivoting shaft assemblies 22, 24 are set back from the main support bar 12 to gain the clearance required from working tools mounted on the main support bar 12 when the folding wings 14, 16 are moved from a transport position to an operational position and vice versa. Positioning the pivoting shaft assemblies 22, 24 rearward of the main support bar 12 provides for folding wings 14, 16 of lengths greater than that disclosed in the prior art.

To further strengthen and stabilize the main support bar 12 and the pivot support bars 18, 20, a main support frame 26 is provided. The main support frame 26 includes a first frame element 28, a second frame element 30, and a third frame element 32. Frame elements 28 and 30 are parallel to one another and perpendicular to the main support bar 12. The third frame element 32 is parallel to the main support bar 12, and perpendicular to frame elements 28 and 30. A reinforcing spacer bar 34 is provided on the upper face of third frame element 32 to further strengthen and stabilize the main support frame 26 and to act as a alignment stopper, abutting wings 14, 16 when wings 14, 16 are in the most rearward, transport position. In an alternate embodiment, reinforcing spacer bar 34 is removed and replaced by a reinforcing spacer bar (not shown), in secure spanning engagement with pivoting shaft assemblies 22, 24, provided for spanning reinforcement of pivoting shaft assemblies 22, 24.

The main support bar 12 further includes a first wing receiving member 36 and a second wing receiving member 38. Wing receiving members 36, 38 are attached on opposing sides and on the tractor-mounting face of main support bar 12. A first support strap 40 attaches the first wing receiving member 36 to the main support bar 12 to further strengthen and stabilize the first wing receiving member 36. A second support strap 42 attaches the second wing receiving member 38 to the main support bar 12 to further strengthen and stabilize the first wing receiving member 38. Wing pin receiving slots 44, 46 are located in the wing receiving members 36, 38 on the main support bar 12. Slots 44, 46 are left vacant when frame assembly 10 is configured in its transport position.

When configured to its transversally extended working position, wings 14, 16 are pivoted about the pivoting shaft assemblies 22, 24, and main support bar connecting brackets 52, 54 are positioned in receptive engagement with wing receiving members 36, 38 such that slots 44, 46 are aligned with the pair of bracket holes 56, 58 to receive wing pins 48, 50. Adjacent to the main support bar connecting brackets 52, 54 and distal to the pivoting shaft assemblies 22, 24 are horizontal pivot members 60, 62. In the preferred embodiment, and as shown in FIG. 3, the main support bar connecting brackets 52, 54 and horizontal pivot members 60, 62 are fabricated as one unit.

Figure 3:
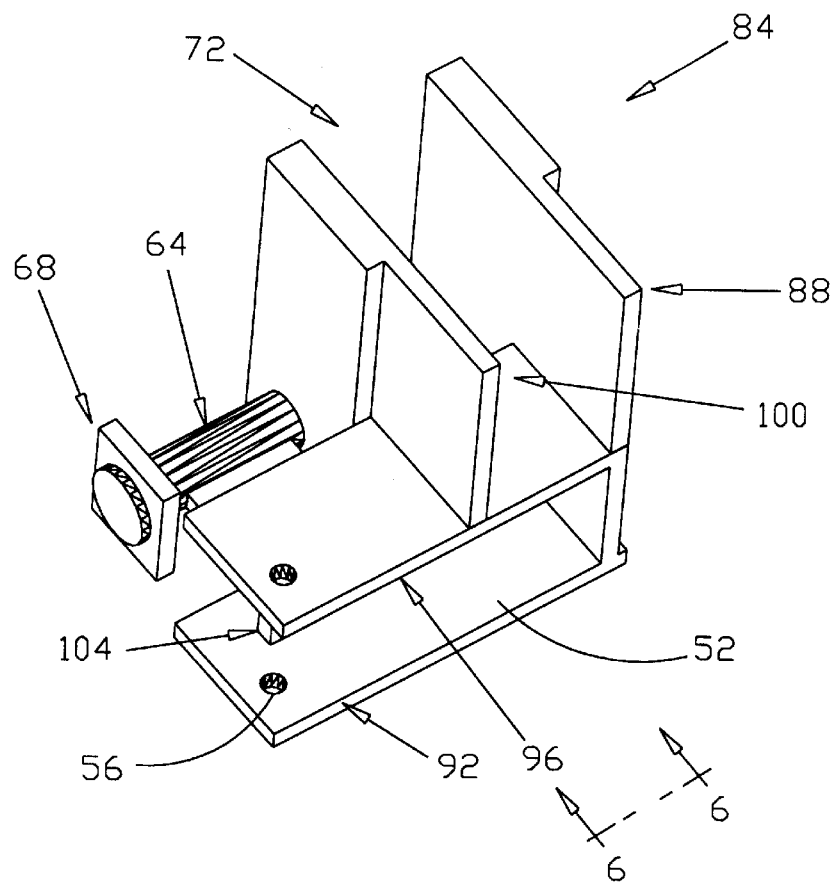
FIG. 3 is an enlarged perspective view of the first main support bar connecting bracket constructed together with the first horizontal pivot member of the implement of FIG. 1.

Referring to FIG. 3, there is shown the first wing main support bar connecting bracket 52, constructed together with the first horizontal pivot member 60. In the preferred embodiment, and as shown for the first wing, the first wing main support bar connecting bracket 52 and the first horizontal pivot member 60 are identified collectively as the first horizontal pivot and bracket assembly 84. A virtually identical, mirror image of assembly 84 is provided for the second wing, the second horizontal pivot and bracket assembly 86, but is not shown in the enlarged view of FIG. 3. The horizontal pivot and bracket assembly 84 includes an elongated pivot post 64, that further includes a wing support strap mount 68. Rear plate 88 perpendicularly abuts bracket base plate 92, which is parallel to bracket top plate 96. Top plate 96 is also a portion of the base of pivotal arm channel 72. Channel 72 is formed by rear plate 88 and front plate 100. Front plate 100 and rear plate 88 are also in receptive engagement with pivot post 64 and wing 14 (not shown). In part, it is the pivotal movement about the horizontal axis of pivot post 64 that allows the height of wing 14 to be adjusted.

Referring to FIG. 3, connecting bracket 52 is further defined by a vertical plate 104. Vertical plate 104 is perpendicular to and secured between bracket top plate 96 and bracket base plate 92. The open portion of connecting bracket 52 is constructed to engage wing receiving member 36 (FIG. 2). Vertical plate 104 forms the vertical wall component of bracket 52 and also receives the post-bracket structural member 80, which is in further communication with pivot post 64. In an alternate embodiment, a plurality of post-bracket structural members are provided, securely engaging pivot post 64 to bracket top plate 96, 98 and further engaging post 64 to bracket base plate 92, 94. Pivotal arm channel 72 receives a pivotal arm 76 for pivotal movement about the pivoting shaft assembly 22 (FIGS. 1 and 2). Virtually identical components are provided for the second wing, a virtual mirror-image of the first wing and its related components.

Figure 4:
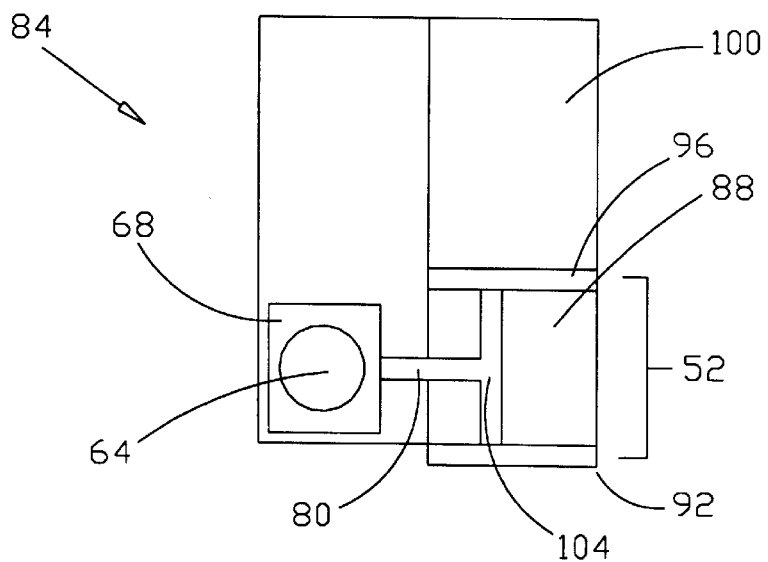
FIG. 4 is an enlarged elevational view, as seen generally from line 4—4 in FIG. 1, showing the main support bar connecting bracket constructed together with the horizontal pivot member.

FIG. 4 illustrates the first horizontal pivot and bracket assembly 84, including the horizontal pivot member 60 and its pivot post 64 in reinforced communication with a first post-bracket structural member 80 in further reinforced communication with the main support bar connecting bracket 52, defined by bracket base plate 92 and bracket top plate 96. Front plate 100 and a portion of rear plate 88 are visible from the elevation offered by FIG. 4.

Figure 5:
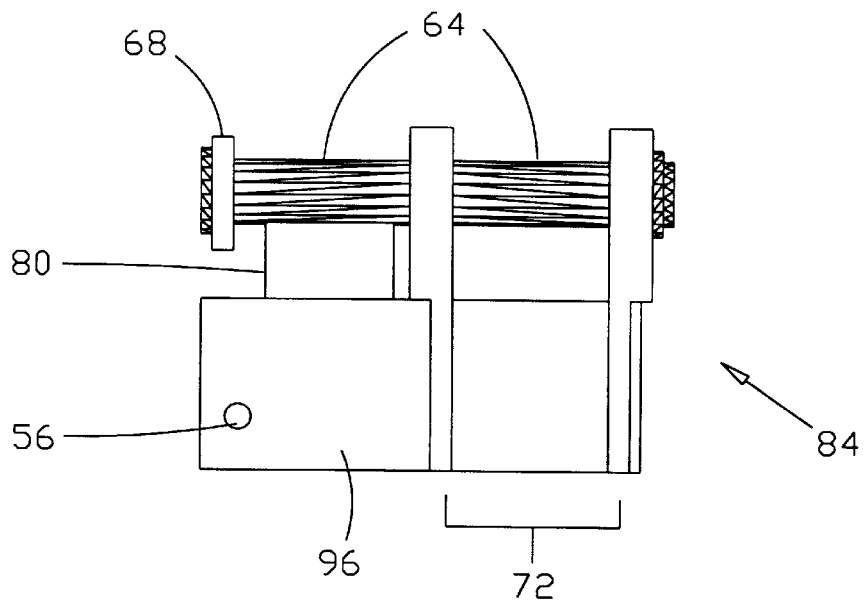
FIG. 5 is an enlarged plan view showing the main support bar connecting bracket and horizontal pivot member of the first wing of the implement of FIG. 1.

FIG. 5 further illustrates the first horizontal pivot and bracket assembly 84, including bracket top plate 96 with bracket hole 56, and post-bracket structural member 80 in reinforcing communication with pivot post 64, including wing support strap mount 68. The pivotal arm channel 72 is defined by front plate 100 and rear plate 88. Channel 72 receives and securely engages pivotal arm 76, enabling the transverse extension of wing 14 (FIGS. 1 and 2).

Figure 6:
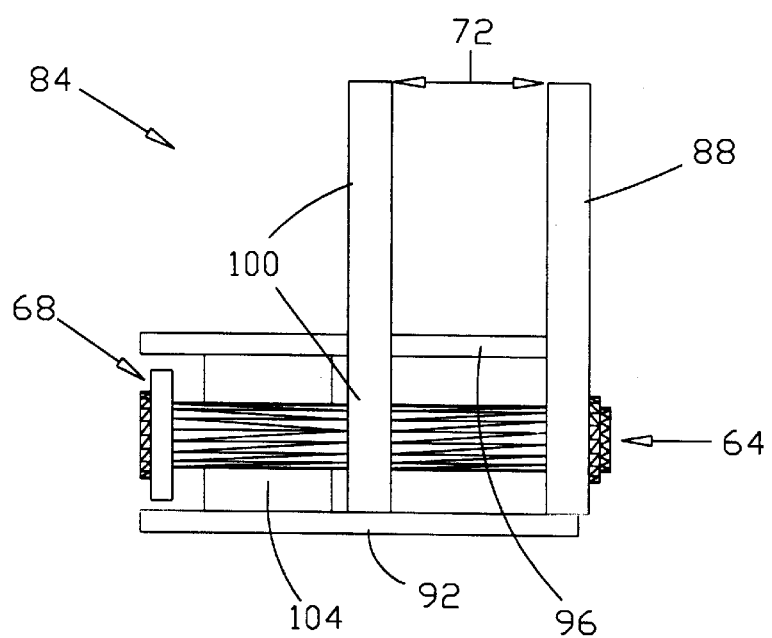
FIG. 6 is an enlarged elevational view, as seen generally from line 6—6 in FIG. 3, showing the main support bar connecting bracket and horizontal pivot member of the first wing.

FIG. 6 further illustrates the first horizontal pivot and bracket assembly 84, including bracket top plate 96, bracket base plate 92, front plate 100, and rear plate 88. Vertical plate 104 effectively hides post-bracket structural member 80 (not shown) in its reinforced communication with pivot post 64. Pivotal arm channel 72 is defined by front plate 100 and rear plate 88. Channel 72 receives and securely engages pivotal arm 76, enabling the transverse extension of wing 14 (FIGS. 1 and 2). In the preferred embodiment, wing 14, 16 is in secure engagement with pivot post 64, 66, wing 14, 16 (FIG. 7).

Figure 7:
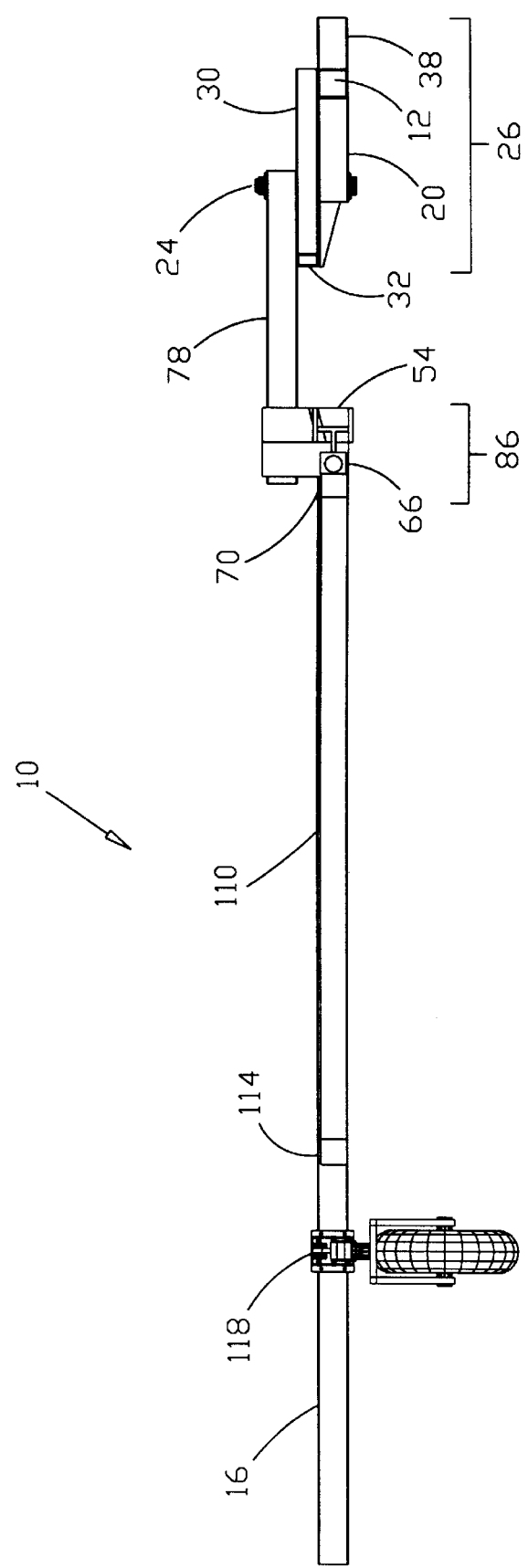
FIG. 7 is an elevational view, as seen generally from line 7—7 in FIG. 1, showing the implement in its transport position.
Figure 10:
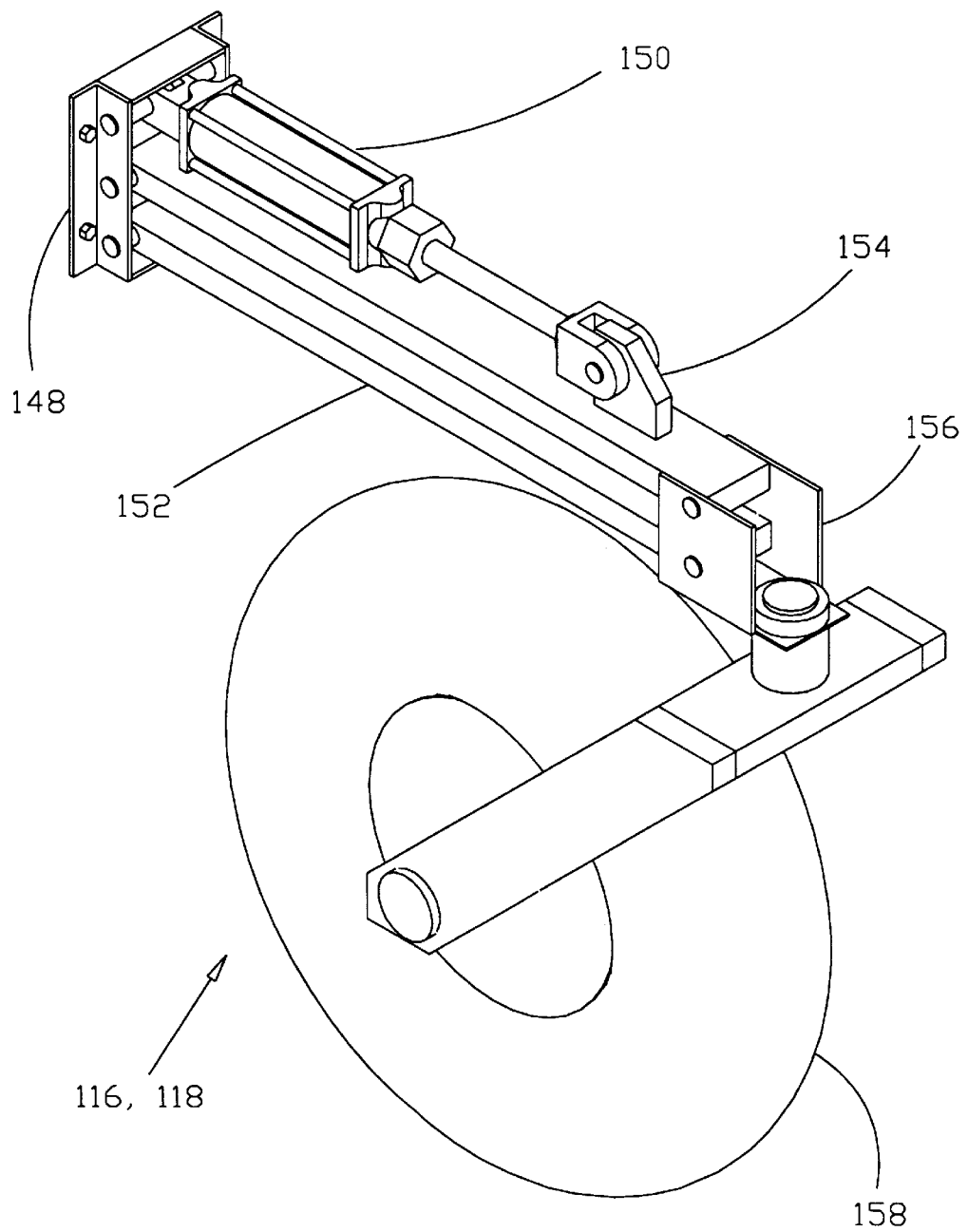
FIG. 10 is a perspective view of a dolly wheel of the implement of FIG. 1.
Figure 11:
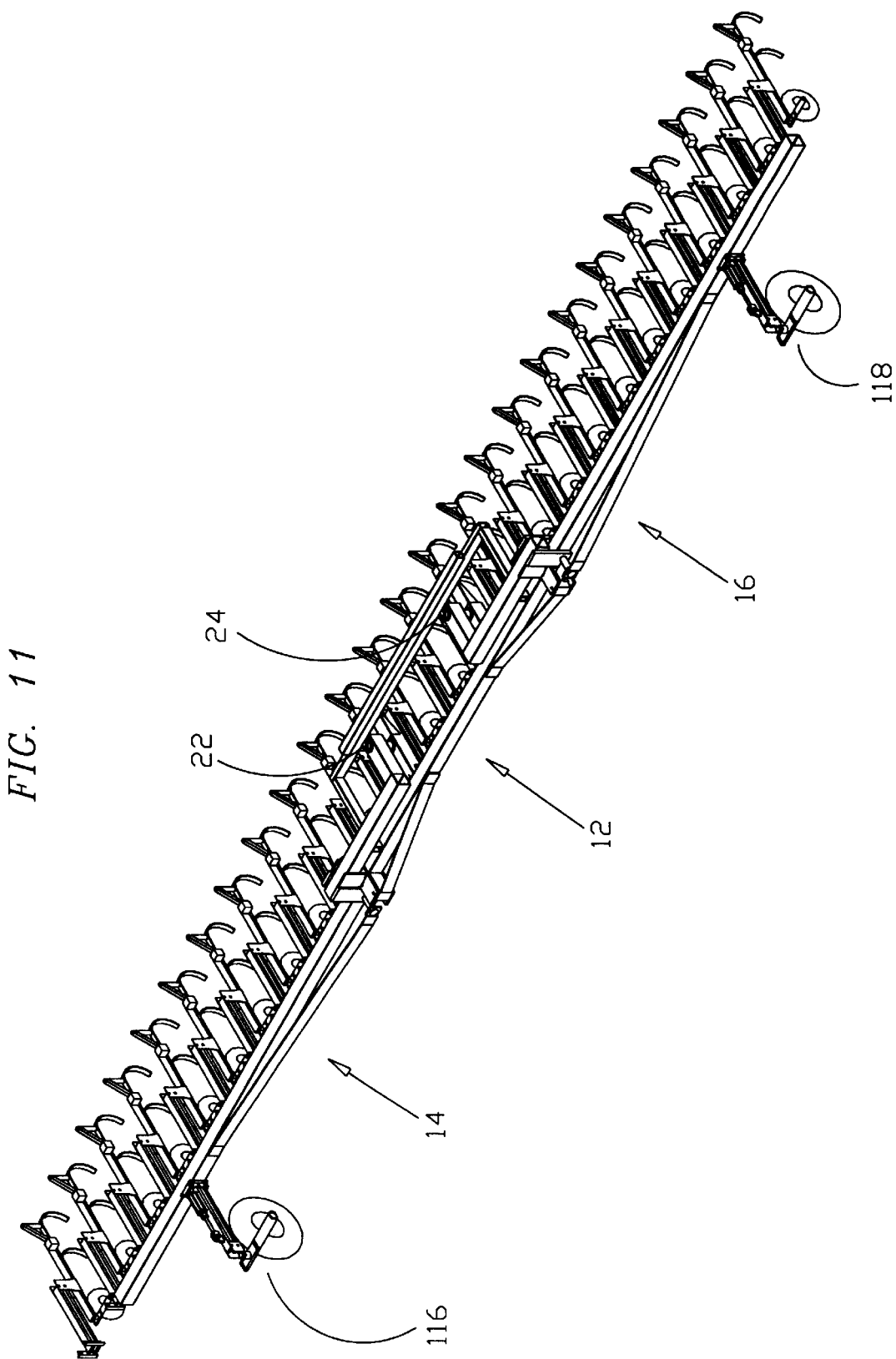
FIG. 11 is a perspective view of the implement of FIG. 1 in an extended operational configuration and shown with earth working tools.

FIG. 7 illustrates the folding support frame assembly 10, and specifically, the left or second side of frame assembly 10. In the preferred embodiment, the wing receiving member 38 is welded to the main support bar 12, which is welded to the pivot support bar 20 (FIG. 2). Second frame element 30 is also welded to the third frame element 32. Accordingly, and as seen in FIG. 7, main support frame 26 includes wing receiving members 38, main support bar 12, pivot support bar 20, the second frame element 30, and the third frame element 32 (also shown in FIG. 2). Pivotal arm 78 is pivotable about main support frame 26 and pivot support bar 20 at an axis defined by the pivoting shaft assembly 24. Note however that pivotal arm 78 pivots without resistance from frame elements 30 and 32. The horizontal pivot and bracket assembly 86 is shown in cooperative engagement with wing 16. Wing 16 is supported for pivotal movement about a horizontal axis defined by pivot post 66. In its operational working position with the wings extended, connecting bracket 54 is releasably engaged with wing receiving member 38 and wing 16 is supported for pivotal movement about a horizontal axis defined by pivot post 66 to allow the height of the wings to be adjusted by extension and retraction of a hydraulic cylinder associated with the dolly wheel assembly 118 (FIG. 10). Wing 16 is further supported by second wing support strap 110, in secure engagement with second wing support strap mount 70 and second distal wing support strap mount 114.

Figure 8:
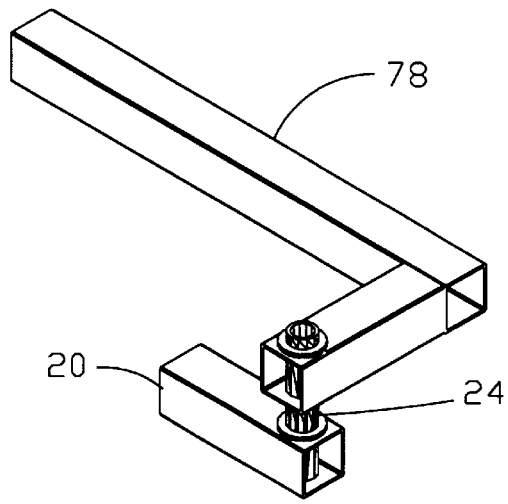
FIG. 8 is a perspective view of the second pivotal arm in pivotal communication with the second pivot support arm of the implement of FIG. 1.
Figure 9:
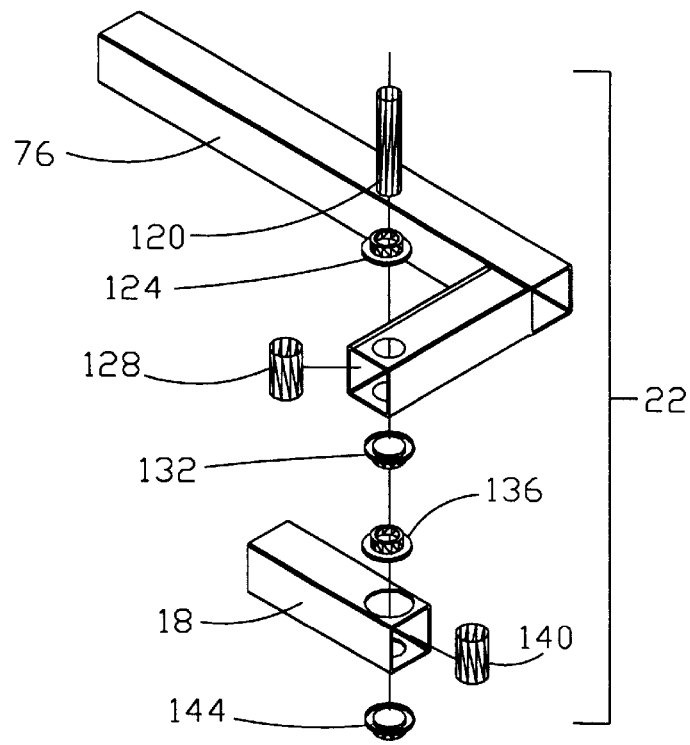
FIG. 9 is an exploded perspective view of the first pivotal arm in pivotal communication with the first pivot support arm, pivotable about the first pivoting shaft assembly of the implement of FIG. 1.

Referring to FIG. 8, the second pivotal arm 78 is shown in pivotal engagement with the second pivot support bar 20 through the second pivoting shaft assembly 24. FIG. 9 shows the mirror image of pivotal arm 78, the first pivotal arm 76 in pivotal engagement with the first pivot support bar 18 through the first pivoting shaft assembly 22. It should be reiterated that in the preferred embodiment, the folding support frame assembly comprises a first and second wing which are mirror images of each other and further comprise identical elements, other than the respective first and second (right and left) orientation. The first pivoting shaft assembly 22 includes a first shaft 120 that is received by a first arm cap 124 that is in secure engagement with the first pivotal arm 76. A first arm sleeve 128 aligns shaft 120 through arm 76 and first arm junction cap 132 receives shaft 120. A first arm junction cap 136 receives shaft 120 and is aligned with first bar sleeve 140 contained within the first pivot support bar 18. A first bar cap 144 receives shaft 120. Bar cap 144 and junction cap 136 are fixed to support bar 18. Arm cap 124 and junction cap 132 are fixed to arm 76. In a preferred embodiment, shaft assembly 22 is provided in two main elements, with shaft 120 fixedly engaged to the first arm junction cap 136, support bar 18, bar sleeve 140, and secured to bar cap 144. Arm junction cap 132 is fixedly engaged to pivotal arm 76 and arm cap 124. In this arrangement, shaft 120 serves as a post about which pivotal arm 76 pivots. In an alternate embodiment, shaft 120 is in fixed communication with pivotal arm 76, free to pivot about an axis defined by sleeve 140, and further secured to support bar 18 by a horizontal pin (not shown) through bar cap 144. In a preferred alternate embodiment, the horizontal pin is provided as a 4 1/2 inch×½ inch nut and bolt arrangement.

FIG. 10 illustrates dolly wheel assembly 116, 118. Dolly wheel assembly 116, 118 are identical, other than dolly wheel assembly 116 is mounted on first wing 14 and dolly wheel assembly 118 is mounted on second wing 16. Elements of dolly wheel assembly 116, 118 are referenced collectively. Dolly wheel assembly 116, 118 include wheel mount assembly 148 that connects dolly wheel assembly 116, 118 to wing 14, 16. Dolly wheel assembly 116, 118 further includes four bar linkage 152 that attaches wheel mount assembly 148 to wheel bracket 156. Four bar linkage 152 includes cylinder mount 154 to receptively dolly wheel cylinder 150 shown attached to wheel mount assembly 148. Dolly wheel 158 is receptively engaged by wheel bracket 156. Dolly wheel 158 rotates about a horizontal axis and pivots freely about a vertical axis in response to directional movement.

Figure 12:
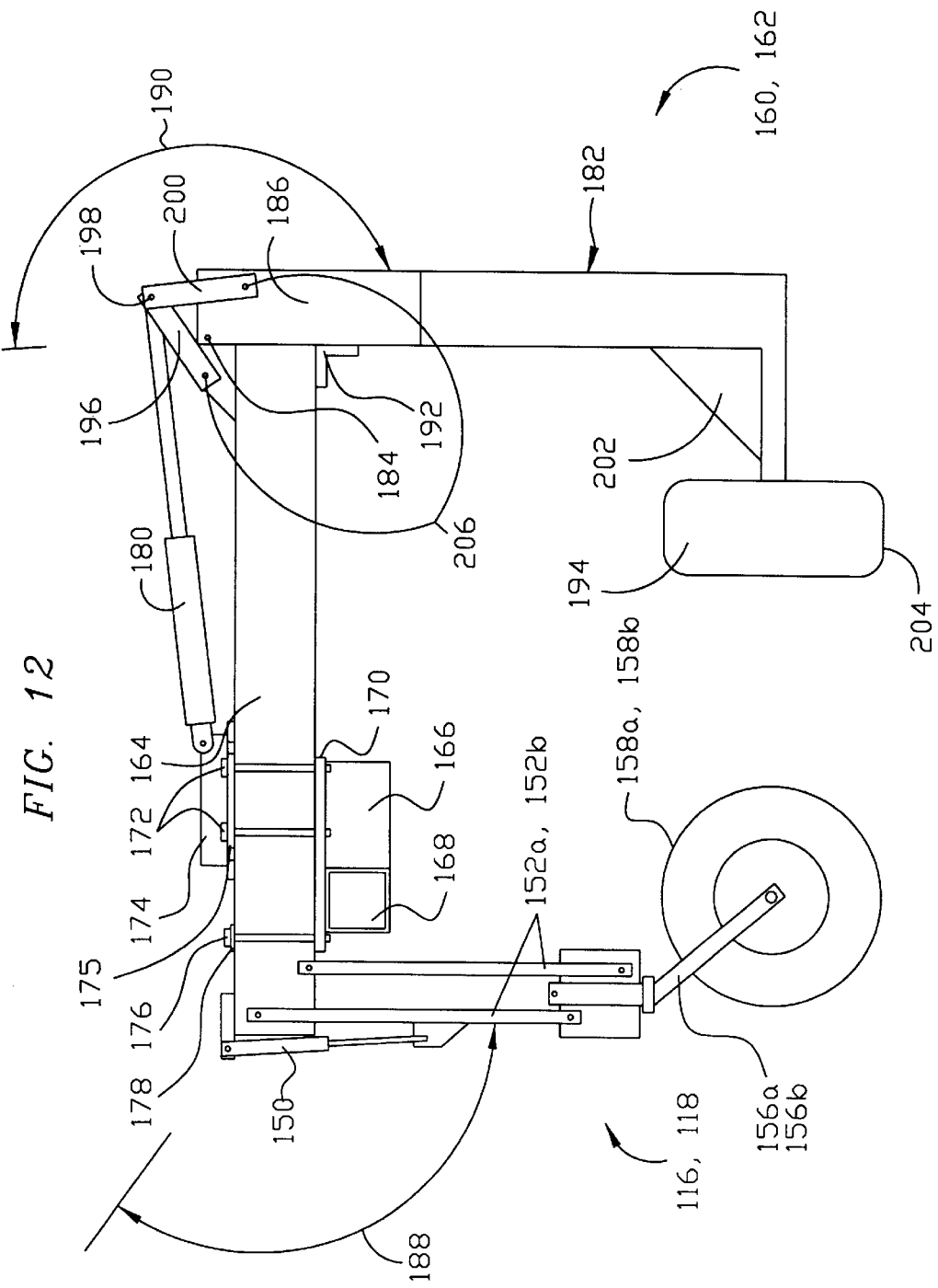
FIG. 12 is an elevational view of an alternate embodiment of a combination dolly wheel and transport wheel assembly of the implement of FIG. 1.

In a preferred embodiment, and as shown in FIG. 12, dolly wheel assembly 116, 118 is provided as a combination wheel assembly 160, 162. Combination wheel assembly 160, 162 includes a pair of dolly wheels 158a and 158b supported by two wheel brackets 156a and 156b in pivotal attachment with two sets of four bar linkages 152a and 152b further attached to combination wheel assembly frame 164. Dolly wheel cylinder 150 is extended or retracted to lower or raise dolly wheels 158 along a path substantially defined by arc 188, showing the relative mobility of four bar linkage 152a working in parallel with four bar linkage 152b (not seen in plan view). The primary function of dolly wheel assembly 116, 118 is to raise and lower wings 14, 16 when the implement is in its earth working position. Dolly wheel assembly 116, 118 is also provided to assist in the configuration of the implement from an earth working position to a transport position and vice-versa.

Continuing to refer to FIG. 12, elements of combination wheel assembly 160, 162 are referenced collectively. Combination wheel assembly frame 164 is attached to wing 14, 16 at wing mount 166. Wing mount 166 includes wing receptacle 168 in fixed engagement with wing 14, 16. Welded to wing mount 166 is wing mount plate 170 provided with a plurality of holes for threadably receiving plate bolts 172. Plate bolts 172 are provided to secure proximal transport wheel cylinder mount 174 to combination wheel assembly frame 164. Strap bolts 176 in threaded engagement with wing mount plate 170 are provided through wing mount strap 178 to further fixedly engage assembly frame 164 to wing mount 166.

Referring still to FIG. 12, transport wheel stand 182 is pivotally attached to frame 164 at horizontal pivot pin 184. Wheel stand 182 includes pivot bracket 186. Pivot bracket 186 receives an outermost end of frame 164 and pivots about pin 184 such that pivot bracket 186 and its related wheel stand 182 travel in a path substantially defined by arc 188. Frame 164 further includes bracing member 192 and when configured to its transport position, wheel stand 182 is abuttably supported by bracing member 192. Frame pin 202 pivotally engages frame-cylinder plate 196, provided to pivotally attach frame 164 to cylinder 180 at pivot pin 198, located at the distal end of cylinder 180. Stand-cylinder plate 200 pivotally attaches pivot bracket 186 to cylinder pivot pin 198. Mounting pins 206 pivotally attach frame 164 with frame-cylinder plate 196 and as well as pivotally attaching travel wheel stand 182 with stand-cylinder plate 200. Transport wheel cylinder 180, acting in concert with frame-cylinder plate 196 and stand-cylinder plate 200, is extended or retracted to pivot wheel stand 182 about horizontal pivot pin 184 in a path substantially defined by arc 188, lowering and raising transport wheel 194. Wheel brace 202 is provided to support transport wheel 194.

In a preferred embodiment and when the wings 14, 16 are in a transverse, earth working position and configured such that the cultivator units engage the soil between rows of crops, the dolly wheels 158 face the primary direction of movement and are positioned to provide the desired depth of cultivator unit soil engagement. Dolly wheel 158 on each wing leads the main support bar 12 and the wings 14, 16 and the dolly wheel cylinders 150 associated with the dolly wheels 158 are substantially retracted. Cultivator unit ground contact and depth of cut are adjusted by manipulating the position of the three-point hitch and the associated main support bar 158, as well as through manipulating the dolly wheel assemblies 116, 118 mounted on each wing. As an operator reaches a location in a field where disturbing the ground is undesirable, the operator raises the three-point hitch and main support bar 12 while extending the dolly wheel cylinders 150, causing a downward movement of the dolly wheels 158 and resulting in raising the toolbar to a desired height. As the operator reaches a location in the field where cultivation is desired, the operator lowers the three-point hitch and main support bar 12 while retracting the dolly wheel cylinders 150, causing an upward movement of the dolly wheels 158 and resulting in lowering the toolbar to a desired height.

To configure the implement to its transport position, the operator raises the three-point hitch and main support bar 12 while extending the dolly wheel cylinders 150, causing a downward movement of the dolly wheels 158 and resulting in raising the toolbar to a desired, substantially ground-parallel, height. Pins 48, 50 in receptive engagement with the extended wings 14, 16 and the wing receiving members 36, 38 are removed. In a preferred embodiment, the main support bar connecting brackets 52, 54 are further provided with hydraulic cylinders (not shown) to engage and disengage pins 48, 50 through bracket holes 56, 58 in communication with wing receiving members 36, 38. The hydraulic pin cylinders allow an operator to configure the implement from a ground working position to a transport position, and vice-versa, without leaving an operating position on a tractor or other towing vehicle.

With the pins 48, 50 removed, the wings 14, 16 are free to pivot about the vertical axis at the pivoting shaft assemblies 22, 24 located at either end of the main support bar 12. The operator then extends cylinder 180 to lower wheel stand 182 to an extent that wheels 194 support the majority of the mass of the wings 14, 16. In a preferred embodiment, the operator maneuvers the tractor and attached implement in a forward direction, thereby causing the disengagement of the wing receiving members 36, 38 and the main support bar connecting brackets 52, 54 on opposing sides of the main support bar 12, and releasing the wings 14, 16 to freely pivot about the pivoting shaft assemblies 22, 24 positioned at either end of the main support bar. As the tractor-implement tandem move forward, a shoulder portion 204 of wheels 194 at the extended end of each of the wings 14, 16 drag and each wing moves in an inward radius until the wings 14, 16 are substantially parallel to each other. The operator then extends fully cylinder 180 to completely lower wheel stands 182 to abut bracing member 192 and wheels 194 support the mass of the support frame 10. In its transport position, the support frame 10 is attached to a tractor at main support bar 12 and wings 14, 16 are free to pivot about pivoting shaft assemblies 22, 24 when changes in direction are required.

When the operator elects to configure the implement from its transport position to its working position, the operator retracts cylinder 180 to raise wheel stands 182 to a point at which wheel shoulder 204 is supporting the mass of the support frame 10 and wings 14, 16. The operator then maneuvers the tractor and attached implement in a rearward direction, causing wheel shoulders 204 of wheels 194 at the extended end of each of the wings 14, 16 to drag and each wing moves in an outward radius until the wings 14, 16 are substantially transverse and in-line with each other. Fully extended wings 14, 16 and the related main support bar connecting brackets 52, 54 engage the wing receiving members 36, 38. Wing pins 48, 50 are placed through bracket holes 56, 58 aligned through the wing receiving members 36, 38 and the main support bar connecting bracket 52, 54 such that the pins 48, 50 securely engage the wing receiving members 36, 38 and the main support bar connecting bracket 52, 54 on opposing sides of the main support bar 12, and fixes the wings in a substantial linear, transverse relationship, thereby establishing the working alignment position of the toolbar. In a preferred embodiment, the main support bar connecting brackets 52, 54 are further provided with hydraulic cylinders (not shown) to engage and disengage pins 48, 50 through bracket holes 56, 58 in communication with wing receiving members 36, 38.

The operator then extends fully dolly wheel cylinders 150, causing the dolly wheels to extend. Retracting fully transport wheel cylinders 180 causes transport wheel stands 182 to pivot upwardly about horizontal pivot pin 184 along a path substantially defined by arc 190. Full retraction of cylinders 180 results in wheel stands 182 projecting substantially perpendicular to the ground. When reaching a desired location in a field, the operator lowers the three-point hitch and main support bar 12, while retracting the dolly wheel cylinders 150 associated with the dolly wheels 158, thereby lowering the toolbar to an operational earth working position.

In a preferred embodiment, plows or blades are provided along the length of the toolbar, including that which comprises the toolbar portion of the main support bar, such that the tool bar is adapted for use as a row cultivator. In a row cultivator embodiment, nine working tools are provided on each wing 14, 16, and seven working tools are provided on main support bar 12, providing twenty-five cultivating working tools for cultivating twenty-four thirty-inch rows of crops. Further, an embodiment of the toolbar with the wings fully extended in a substantial linear, transverse relationship, the working width is approximately 60 feet. In its transport mode with the wings fully retracted, the transport width is seventeen and one-half feet.

In an alternate embodiment, the tool bar is adapted for receiving agricultural attachments for use as a seed planter. In another alternate embodiment, the tool bar is adapted for receiving agricultural attachments for use as a rotary hoe. In another alternate embodiment, the tool bar is adapted for receiving agricultural attachments for use as an anhydrous bar.

It has been found desirable in the construction of the wings 14, 16, the main support frame 26, combination wheel assembly frame 164, wing mount 166, and transport wheel stand to use steel tubing in the following dimensions (in inches): 7×7×⅜ wall. Support straps 40, 42 and wing support straps 108, 110 are ½ inch by 6 inch steel strapping. It has also been found desirable in the construction of the wing pins 48, 50 and pivot members 60, 62 to use solid steel cylinders 24 inches in length and fashioned in a diameter consistent with the dimensions of the wing receiving slots 44,46 or about 3 inches. 1 inch by 8 inch steel plates have been found desirable to fashion the horizontal pivot and bracket assembly 84, 86; pivot bracket 186; cylinder mount plate 175; and wing mount plate 170.

The foregoing description and drawings comprise illustrative embodiments of the present inventions. The foregoing embodiments described herein may vary based on the ability, experience, and preference of those skilled in the art. The foregoing description and drawings merely explain and illustrate the invention. Those skilled in the art who have the disclosure before them will be able to make modifications and variations therein without departing from the scope of the invention.

I claim:

1. A folding frame for supporting agricultural tools comprising:

a main bar adapted for attachment to a towing vehicle;

a plurality of tools mounted to the main bar;

a frame mounted to the main bar for supporting a pair of arms;

a pair of wings attached to the arms;

a plurality of tools mounted to the wings;

a dolly wheel on each wing, wherein the dolly wheel further comprises a four-bar linkage in movable engagement with an actuator providing adjustment of the dolly wheel to a plurality of positions; and a pair of pivoting shaft assemblies on the frame for pivoting the arms about a substantially vertical axis, wherein the shaft assemblies are set rearward to avoid contact between the bar-mounted tools and the wing-mounted tools as the wings are moved from a substantially rearwardly extended transport position to a transversely extended working position.

2. The folding frame of claim 1 wherein the wings are pivotable about a substantially horizontal axis.

3. The folding frame of claim 2 further comprising a wheel assembly mounted on each wing comprising said dolly wheel and a transport wheel.

4. The folding frame of claim 3 wherein the dolly wheel further comprises a four-bar linkage in movable engagement with an actuator providing adjustment of the dolly wheel to a plurality of positions.

5. The folding frame of claim 4 wherein the actuator is a hydraulic cylinder.

6. The folding frame of claim 3 wherein the transport wheel is pivotally attached to the wheel assembly having an actuator providing adjustment of the transport wheel to a plurality of positions.

7. The folding frame of claim 6 wherein the actuator is a hydraulic cylinder.

8. The folding frame of claim 3 wherein the dolly wheel further comprises a four-bar linkage in movable engagement with an actuator providing adjustment of the dolly wheel to a plurality of positions, and wherein the transport wheel is pivotally attached to the wheel assembly having an actuator providing adjustment of the transport wheel to a plurality of positions.

9. The folding frame of claim 8 wherein the dolly wheel actuator and the transport wheel actuator are hydraulic cylinders.

10. The folding frame of claim 8 wherein the dolly wheel provides wing adjustment when the frame is extended transversely to the working position and wherein the transport wheel is adjusted to provide resistance to assist the transition from a substantially transversely extended working position to a substantially rearwardly extended transport position.

11. The folding frame of claim 8 wherein the transport wheels are adjusted to provide resistance to assist the transition from a substantially rearwardly extended transport position to a substantially transversely extended working position.

12. The folding frame of claim 1 wherein the actuator is a hydraulic cylinder.

13. A folding frame for supporting agricultural tools comprising:

a main bar adapted for attachment to a towing vehicle;

a plurality of tools mounted to the main bar;

a frame mounted to the main bar for supporting a pair of arms;

a pair of wings attached to the arms;

a plurality of tools mounted to the wings;

a pair of pivoting shaft assemblies on the frame for pivoting the arms about a substantially vertical axis, wherein the shaft assemblies are set rearward to avoid contact between the bar-mounted tools and the wing-mounted tools as the wings are moved from a substantially rearwardly extended transport position to a transversely extended working position, and wherein the wings are further pivotable about a substantially horizontal axis;

a wheel assembly mounted on each wing having a dolly wheel and a transport wheel, wherein the dolly wheel further comprises a four-bar linkage in movable engagement with an actuator providing adjustment of the dolly wheel to a plurality of positions, and wherein the transport wheel is pivotally attached to the wheel assembly having an actuator providing adjustment of the transport wheel to a plurality of positions.

14. The folding frame of claim 13 wherein the dolly wheel actuator and the transport wheel actuator are hydraulic cylinders.

15. The folding frame of claim 13 wherein the dolly wheel provides wing adjustment when the frame is extended transversely to the working position and wherein the transport wheel is adjusted to provide resistance to assist the transition from a substantially transversely extended working position to a substantially rearwardly extended transport position.

16. The folding frame of claim 13 wherein the transport wheels are adjusted to provide resistance to assist the transition from a substantially rearwardly extended transport position to a substantially transversely extended working position.

* * * * *